United States Patent
Huang (10) Patent No.: US 8,260,121 B2
(45) Date of Patent: Sep. 4, 2012

(54) SYSTEMS AND METHODS FOR WRITING DATA TO AN OPTICAL DISC

(75) Inventor: Mao-Yu Huang, Taoyuan (TW)

(73) Assignee: Cyberlink Corp., Shindian, Taipei (TW)

( * ) Notice: Subject to any disclaimer, the term of this patent is extended or adjusted under 35 U.S.C. 154(b) by 1715 days.

(21) Appl. No.: 11/415,745

(22) Filed: May 2, 2006

(65) Prior Publication Data

US 2007/0263991 A1    Nov. 15, 2007

(51) Int. Cl.
    *H04N 5/76*    (2006.01)
(52) U.S. Cl. .......................... 386/295; 386/292
(58) Field of Classification Search .................. None
    See application file for complete search history.

(56) References Cited

U.S. PATENT DOCUMENTS

| | | | |
|---|---|---|---|
| 4,496,993 A | 1/1985 | Sugiyama et al. | |
| 4,627,044 A | 12/1986 | Takahashi et al. | |
| 4,680,747 A | 7/1987 | Blake, III | |
| 4,716,557 A | 12/1987 | Otani | |
| 4,809,094 A | 2/1989 | Akiyama | |
| 4,931,927 A | 6/1990 | Ishiwata et al. | |
| 5,077,722 A | 12/1991 | Geist et al. | |
| 5,271,018 A | 12/1993 | Chan | |
| 5,325,352 A | 6/1994 | Matsumoto | |
| 5,721,715 A | 2/1998 | Mitani et al. | |
| 5,870,583 A | 2/1999 | Maeda | |
| 6,061,308 A | 5/2000 | Nakamizo | |
| 6,088,304 A | 7/2000 | Aramaki et al. | |
| 6,115,333 A * | 9/2000 | Igarashi | 369/44.27 |
| 6,188,662 B1 | 2/2001 | Maeda et al. | |
| 6,223,247 B1 | 4/2001 | Otsuka et al. | |
| 6,411,771 B1 | 6/2002 | Aotake | |
| 6,643,453 B1 | 11/2003 | Arai et al. | |
| 6,816,666 B1 | 11/2004 | Kanai et al. | |
| 7,385,898 B2 * | 6/2008 | Lee et al. | 369/53.29 |
| 7,460,326 B1 * | 12/2008 | Sutardja | 360/75 |
| 2002/0025135 A1 | 2/2002 | Ando et al. | |
| 2002/0025136 A1 | 2/2002 | Ando et al. | |
| 2002/0031334 A1 | 3/2002 | Tanizawa et al. | |
| 2002/0061181 A1 | 5/2002 | Honjo | |
| 2002/0106187 A1 | 8/2002 | Inque | |
| 2002/0191955 A1 | 12/2002 | Koike et al. | |
| 2003/0081938 A1 | 5/2003 | Nishimura et al. | |
| 2003/0118320 A1 | 6/2003 | Ando et al. | |
| 2003/0190156 A1 | 10/2003 | Arai et al. | |
| 2003/0206714 A1 | 11/2003 | Ando et al. | |
| 2004/0131330 A1 | 7/2004 | Wilkins et al. | |
| 2004/0133924 A1 | 7/2004 | Wilkins et al. | |
| 2004/0205442 A1 | 10/2004 | Chuang et al. | |
| 2005/0008329 A1 | 1/2005 | Suzuki et al. | |
| 2005/0147381 A1 | 7/2005 | Koike et al. | |
| 2005/0147382 A1 | 7/2005 | Koike et al. | |
| 2005/0183018 A1 | 8/2005 | Shinkai et al. | |

\* cited by examiner

*Primary Examiner* — Jamie Atala
(74) *Attorney, Agent, or Firm* — Thomas, Kayden, Horstemeyer & Risley, LLP (57) ABSTRACT

Systems and methods are disclosed for writing data to an optical disc. In one example, a method includes the steps of receiving data to be written to an optical disc, determining the size of the data to be written to the optical disc, generating a file system image for the optical disc, writing the file system image to the optical disc and writing the data to the optical disc at a space beginning at a LBA located at a distance equal to about the size of the data from the last available LBA and terminating at about the last available LBA of the optical disc.

42 Claims, 7 Drawing Sheets

SYSTEMS AND METHODS FOR WRITING DATA TO AN OPTICAL DISC

TECHNICAL FIELD

The present invention is generally related to data storage on optical discs and, more particularly, is related to a system and method for increasing performance of reading and writing data from an optical disc.

BACKGROUND OF THE INVENTION

Optical discs are a popular storage media for data that typically include a circular, usually flat and often polycarbonate medium whereon data is stored. As the field of optical discs and optical storage media has advanced, various optical media formats have been developed, increasing the storage capacity with each subsequent generation. As an example, the optical disc format compact disc recordable (CD-R), when utilized in a computing environment, allows for the storage of 650 megabytes (MB) and can also offer storage capacities in excess of 800 MB when manufactured outside of the tolerances set forth by CD-R industry standards. A subsequent generation of optical media, digital versatile disc (DVD), formerly digital video disc, closely resembles the compact disc in outward appearance, but offers much higher storage capacities. One DVD standard often utilized in a computing environment is the digital versatile disc recordable DVD-R standard, which can offer a storage capacity of approximately 4.7 gigabytes (GB) when used in a computing environment. DVD media can also offer a storage capacity of over 8 GB in dual layer form, as is the case with the DVD-R DL standard, which is also often used in a computing environment for data storage.

Examples of subsequent generations of optical disc media such as Blue-ray Disc (BD) and High Definition DVD (HD DVD) can offer even higher data storage capacities. HD DVD re-writable, or HD DVD-RAM, an HD DVD format which can be used in a computing environment, can offer data storage capacities of in excess of 15 GB in single layer form and 30 GB in dual layer form. Current generations of Blue-ray Disc media formats used in computing environments, BD write-once (BD-R) and BD re-writable (BD-RE), can offer storage capacities in excess of 25 GB per layer. Generally speaking, data is stored on a data track of an optical disc, which can take the form of at least one spiral groove starting from the center of an optical disc that is read by a laser. Different optical media formats can have differing groove sizes and multiple layers of grooves. Some optical media formats also specify areas of the disc that are "reserved," or, in other words not user addressable. These differing characteristics can create the requirement that various optical disc media formats be read by lasers of varying wavelengths.

One way of storing or "burning" data to each of the above-mentioned generations of optical disc media requires interaction between a host computer and an optical disc drive that has the capability to write data to optical disc media. Optical disc drives that have the capability to write data to optical disc media can be categorized by the way in which they spin optical disc media when writing data to an optical disc. Often an optical disc drive has the ability to operate in more than one of these modes in order to write data to an optical disc. An optical disc drive operating in constant linear velocity (CLV) mode spins an optical disc at a higher rotational speed when the optical head is towards the inner portion of the disc and at a slower rate when the optical head is towards the outer portion of the disc. An optical disc drive operating in CLV mode will maintain a constant linear velocity of the data track(s) on an optical disc relative to the optical head of the optical disc drive when writing data to the disc. Writing at higher speeds in CLV mode can require the optical disc drive to spin an optical disc at extremely high speeds when the optical head is towards the inner portion of the disc, which can place physical demands on the optical disc outside of normal tolerances. The writing speed of an optical disc drive operating in CLV is directly related to the amount of data to be written to the optical disc.

An optical disc drive can also operate in constant angular velocity (CAV) mode when writing data to an optical disc. In CAV mode an optical disc drive spins the optical disc at a constant RPM, which has the effect of causing data tracks toward the outer edge or outer region of the optical disc to have a higher linear velocity relative to an optical head of an optical disc drive as compared to the track when viewed towards the inner edge or inner region of the disc. As a result, data transfer rates and write speeds can continuously increase as the optical head of the optical disc drive moves toward the outer edge of the optical disc. As is known in the art, there are other modes in which an optical disc drive can operate when writing data to an optical disc that can mix the properties and performance characteristics of CLV drives and CAV drives. These can include, but are not limited to: zone constant linear velocity (ZCLV) and partial constant angular velocity (PCAV).

As is also known in the art, the storing or writing of data to an optical disc is generally a slow process relative to the storing of data to a platter based hard disk drive that is often a component of a computer system. The writing of data to an optical disc can often act as a bottleneck in terms of performance of a computer system. This can be the case particularly with optical disc drives operating in a mode other than CLV mode because, as noted above, when the linear velocity of an optical disc increases relative to the optical head of an optical disc drive, data transfer rates and writing speed can increase as the optical head moves toward the outer edge of the optical disc. However, as is known in the art, the starting point of data is generally as close to the inner edge or region of the optical disc as possible, which in the case of non-CLV optical disc drives can result in slow writing speeds. If the size of the data to be written to the optical disc is less than the data storage capacity of the optical disc, then performance and speed of the writing process is less than optimal. Thus, a heretofore unaddressed need exists in the industry to address the aforementioned deficiencies and inadequacies.

SUMMARY OF THE INVENTION

Embodiments of the present invention provide a system and method for writing data to an optical disc. The present invention can be viewed as providing methods for writing data to an optical disc. In this regard, one embodiment of such a method, among others, can be broadly summarized by the following steps: receiving data to be written to an optical disc and determining the size of the data, generating a file system image, writing the file system image to the optical disc and writing the data at a space beginning at a distance from the outer region of the disc substantially equal to the size of the data and terminating at or about the outer region of the optical disc. The present invention can also be viewed as providing systems implementing methods described by the disclosure.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present disclosure generally relates to systems and methods for improving the performance of reading and writing data to an optical disc. In accordance with one embodiment, a method can include the step of receiving data to be written, recorded, or "burned" to an optical disc. A method can also include the step of determining the size of the data and the storage capacity of the optical disc. Further, it can include generating a file system image on the basis of the data and the size of the optical disc. An optical disc can be formatted to store data using the Universal Disk Format (UDF) format specification, which is known in the art as a file system specification frequently in the application of optical disc data storage. However, it would be appreciated by a person of ordinary skill in the art that other file system specifications and formats could be used in accordance with the teachings of the disclosure, including but not limited to: ISO9660 or Joliet file system specifications.

The file system image directs an optical disc drive, when reading an optical disc, as to the physical location of data on the optical disc. The file system image is often written near a lead-in area or track of an optical disc or near the inner edge or region of an optical disc and describes the structure of the files stored on the optical disc. An inner region of an optical disc is located near or adjacent to the first addressable or writeable spaces on an optical disc closest to the center of the optical disc, as it would be appreciated that data cannot be located on areas of the disc without a data track. The lead-in track of an optical disc is often the first area to be read when a disc is read and contains various information about the optical disc and is often located adjacent to or closest to the inner edge or region of an optical disc. It would also be appreciated that a file system image may not necessarily be written to an inner region of an optical disc, as the UDF specification, for example, provides that a file system image can be written to various other locations on an optical disc.

In accordance with one embodiment, a method can further include the step of writing the file system image to an optical disc and writing the data to the optical disc at a space beginning at an LBA located at a distance equal to about the size of the data from the last available LBA and terminating at about the last available LBA of the optical disc. In other words the data can be written to the optical disc at a space at an outer region of the optical disc rather than to a space beginning adjacent to the file system image, if located at or near the first logical block address (LBA) of the optical disc, or adjacent to the lead-in information or inner region of the optical disc.

Other systems, methods, features, and/or advantages will be or may become apparent to one with skill in the art upon examination of the following drawings and detailed description. It is intended that all such additional systems, methods, features and/or advantages be included within this description and be protected by the accompanying claims.

Having summarized various aspects of the present disclosure, reference will now be made in detail to the description as illustrated in the drawings. While the disclosure will be described in connection with these drawings, there is no intent to limit it to the embodiment or embodiments disclosed therein. On the contrary, the intent is to cover all alternatives, modifications, and equivalents included within the spirit and scope of this disclosure as defined by the appended claims. It should be emphasized that many variations and modifications may be made to the above-described embodiments. All such modifications and variations are intended to be included herein within the scope of this disclosure and protected by the claims following this disclosure.

Figure 1:
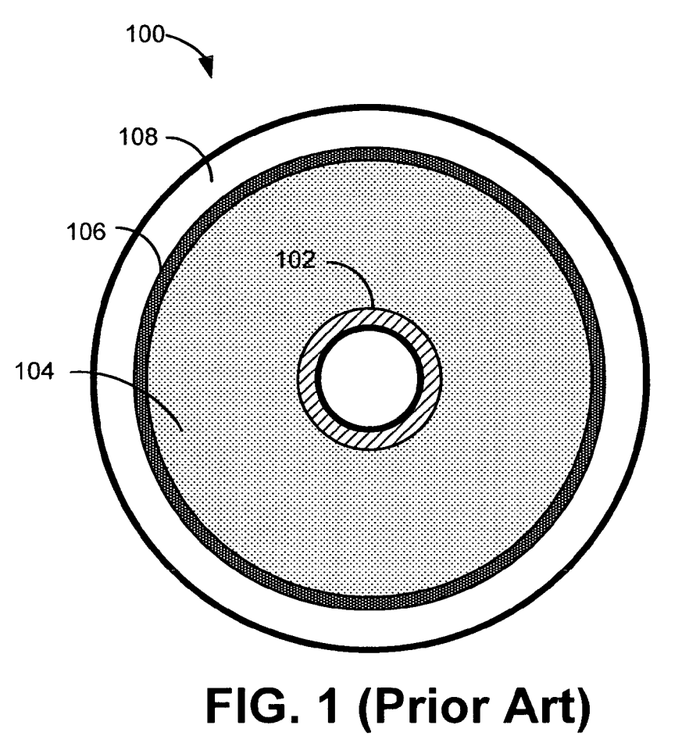
FIG. 1 is a side view of an optical disc showing an arrangement of data as written by an optical disc drive, as is known in the prior art.

FIG. 1 represents a side view of an optical disc 100 showing arrangement of data 104 written to an exemplary optical disc 100 as is known in the prior art. As mentioned above, data 104 is generally stored on an optical disc on a data track, which can take the form of at least one spiral groove starting from the center of an optical disc extending outwards to the outer edge of the optical disc that is read by a laser. Different optical media formats can have differing groove sizes and multiple layers of grooves. These differing characteristics can create the requirement that various optical disc media formats be read by lasers of varying wavelengths.

In the depicted optical disc a file system image 102 is written to the optical disc at the first logical block address (LBA) of the optical disc, which can be adjacent to the inner region of the optical disc 100 or located at the innermost point of the data track of the optical disc. The location of the file system image 102 can also be described as adjacent to a lead-in area or the inner region of the optical disc 100. It would also be appreciated, however, that a file system image may not necessarily be written to an inner region of an optical disc, as the UDF specification, for example, provides that a file system image can be written to various other locations on an optical disc. The file system image 102 directs an optical disc drive, when reading an optical disc 100, as to the physical location of data and the structure of the file system of the data stored on the optical disc and is generated on the basis of the data storage capacity of the disc, the size of the data to be written to the disc, and other factors known to a person of ordinary skill in the art.

The data 104 stored on the optical disc 100 is located adjacent to the file system image 102, as systems and methods of writing data to an optical disc drive known in the art generally write data substantially adjacent to the file system image 102 of the optical disc 100 if the file system image 102 is located at or near the first LBA of the optical disc 100. Additionally, systems and methods known in the art for writing data to an optical disc also write a lead-out track 106 of the optical disc adjacent to the data 104 stored on the optical disc 100. In the case of an optical disc where the data stored thereon does not require all of the available storage capacity of the optical disc, unused or empty space 108 typically remains towards the outer region of the disc.

Figure 2:
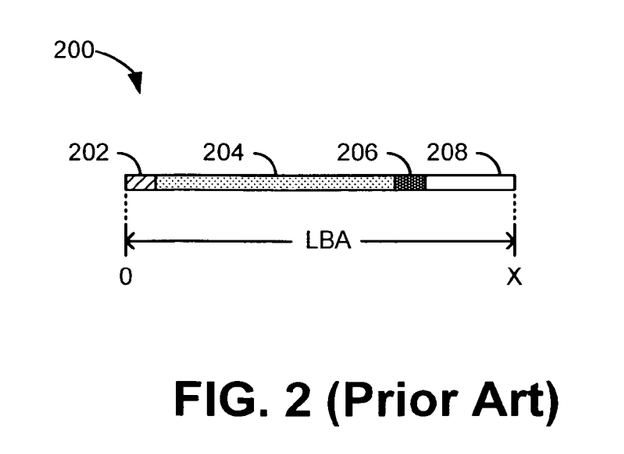
FIG. 2 is a cross-sectional view of the optical disc of FIG. 1 also illustrating a range of logical block addresses of an optical disc.

FIG. 2 depicts a cross sectional view of the optical disc 200 of FIG. 1. Also depicted is a representation of the range of logical block addresses of the optical disc 200 from 0 to X, where X can represent the highest address consistent with the capacity of the optical disc. As is consistent with the prior art, the file system image 202 is stored on the optical disc at the first logical block address (LBA) and the data 204 is generally stored at the next available LBA after the file system image 202. A lead-out track 206 is a track that informs an optical disc drive reading the optical disc 200 that the end of the data 204 stored on the optical disc 200 has been reached. It would also be appreciated, however, that a file system image 202 may not necessarily be written to an inner region of an optical disc, as the UDF specification, for example, provides that a file system image can be written to various other locations on an optical disc.

Figure 3:
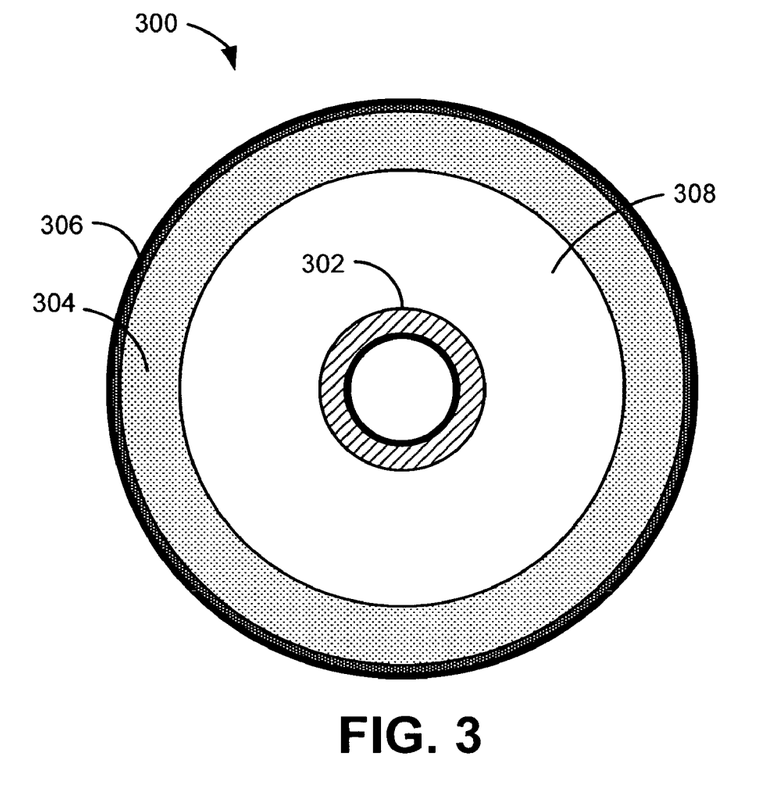
FIG. 3 is a side view of an optical disc showing an arrangement of data in accordance with an embodiment of the disclosure as written by an optical disc drive.

FIG. 3 depicts an optical disc 300 with data 304 stored thereon in accordance with an embodiment of the disclosure. The depicted optical disc 300 used in accordance with an embodiment of the disclosure can conform to a variety of optical disc types and specifications known to a person of ordinary skill in the art, including but not limited to: magneto-optical discs, Blue-ray Disc (BD), Blue-ray Disc Rewritable (BD-RE), Blue-ray Disc Write-once (BD-R), HD DVD, HD DVD-RW, HD DVD-RAM, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW. In contrast to the optical disc depicted in FIGS. 1 and 2, the arrangement of the data 304 and the lead-out track is altered to improve the performance of the reading and writing of data. As mentioned above, an optical disc drive operating in constant angular velocity (CAV) mode can exhibit higher data transfer speeds and write speeds as the optical head of an optical disc drive moves towards the outer region of the optical disc. This is the case because the linear velocity of the disc increases relative to the optical head of the drive as the optical head moves towards the outer region.

Generally speaking, when an optical disc is written in accordance with the disclosure, the starting location of data written to the optical disc is calculated from the end of the disc, taking into account the size of the data to be written. Therefore, an optical disc containing data written in accordance with an embodiment of the disclosure can be written and read with higher performance relative to the optical disc of FIGS. 1 and 2, particularly if used in conjunction with an optical disc drive operating in CAV mode. The reading and writing performance can be improved for any optical disc drive that is not operating in constant linear velocity (CLV) mode because, as mentioned above, an optical disc drive not operating in CLV mode often causes the linear velocity of the optical disc relative to the optical head of an optical disc drive to increase if the optical head is towards the outer region of the optical disc.

The file system image 302 is written at a location on the optical disc 300 similar to the optical disc 100 depicted in FIG. 1 and known in the prior art. The file system image 302 directs an optical disc drive, when reading an optical disc, as to the physical location of data and the structure of the file system of the data 304 stored on the optical disc 300 and is generated on the basis of the data storage capacity of the disc, the size of the data to be written to the disc, and other factors known to a person of ordinary skill in the art. The data 304 is written to an area on the optical disc towards the outer region of the disc, as is a lead-out track 306. A lead-out track 306 is a track that informs an optical disc drive reading the optical disc 300 that the end of the data 304 stored on the optical disc 300 has been reached, and is not user addressable or writeable. Any unused or remaining free space 308 on the optical disc 300 is located toward the inner region of the disc adjacent to the file system image 302. As noted above, the arrangement of data 304 on the optical disc 300 of FIG. 3 in accordance with an embodiment of the disclosure can increase the performance of read and write operations when used in conjunction with an optical disc drive not operating in CLV mode because the data 304 stored on the optical disc 300 is located in an area of the disc 300 where data transfer rates can be highest due to the potentially higher RPM and linear velocity of the data 304 on an optical disc 300 being read by an optical head of an optical disc drive.

Figure 4:
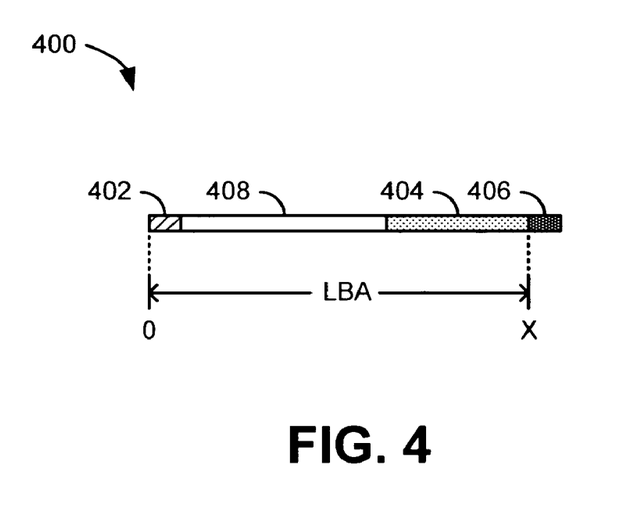
FIG. 4 is a cross-sectional view of the optical disc of FIG. 3 also illustrating a range of logical block addresses of an optical disc.

FIG. 4 represents a cross-sectional view of the optical disc 300 of FIG. 3. Also depicted is a representation of the range of logical block addresses of the optical disc 400 from 0 to X, where X can represent the highest address consistent with the capacity of the optical disc. The file system image 402 is written on the optical disc 400 at the first LBA and, as mentioned above, contains information about the file system and the manner in which files are structured on the disc 400, including the physical and logical location of data. As noted above, it would also be appreciated that a file system image may not necessarily be written to an inner region of an optical disc, as the UDF specification, for example, provides that a file system image can be written to various other locations on an optical disc. The data 404 stored on the optical disc 400 is written in a space terminating at the last or highest available LBA. A lead-out track 406 is a track that informs an optical disc drive reading the optical disc 400 that the end of the data 404 stored on the optical disc 400 has been reached and is not user addressable.

The optical disc depicted in FIG. 3-4 is shown for illustrative purposes, and a person of ordinary skill in the art would appreciate that the teachings of the disclosure can be applied to rewritable or other optical discs that have data already stored thereon. A person of ordinary skill in the art would also appreciate that the teachings of the disclosure can be applied to optical discs recorded with multiple sessions or "multi-session" discs, which may require more than one file system image, lead-in track or lead-out track, or an optical disc that requires none of the above.

Figure 5:
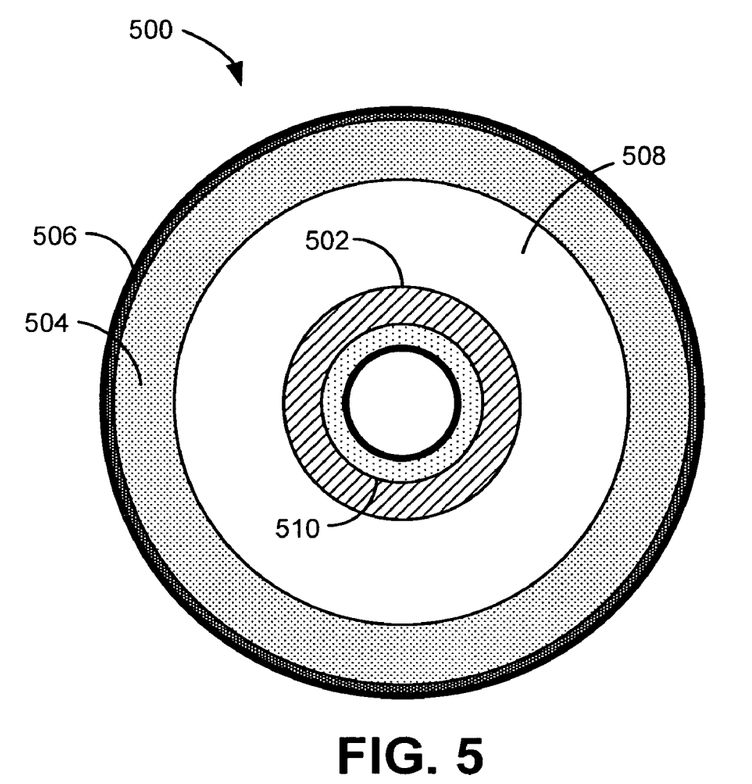
FIG. 5 is a side view of an optical disc showing an arrangement of data in accordance with an embodiment of the disclosure as written by an optical disc drive.

FIG. 5 also depicts an optical disc 500 with data stored thereon in accordance with an embodiment of the disclosure. In contrast the optical disc 300 and 400 depicted in FIGS. 3 and 4, the optical disc 500 of FIG. 5 represents an optical disc 500 that may have area on its surface that is reserved space 510, such as, for example a lead-in track, and cannot be used for the storage or addressing of data. As a non-limiting example of such a scenario, the digital versatile disc (DVD) format reserves the innermost region of each DVD disc to hold information specific to disc management and laser output to ensure compatibility with a broad range of DVD optical disc drives. This reserved space 510 on the exemplary optical disc cannot be used for the writing of the file system image 502 or data 504, therefore, in accordance with the embodiment the file system image 502 can be stored at the lowest available LBA adjacent to the lead-in information, or in other locations allowed by a file system specification. The data 504 can be written at the highest available LBA also taking into account reserved spaces, such as, for example, reserved space 506, that may be present on an optical disc 500 and unavailable for the storage of data. Reserved space 506 can represent, for example a lead-out track or lead-out area of an optical disc, which is not a user-addressable or writeable area of this exemplary optical disc. Because reserved spaces 506 and 510 are not user-addressable or writeable, the file system image 502 and data 504 are written to areas of the optical disc 500 not within these reserved spaces.

Figure 6:
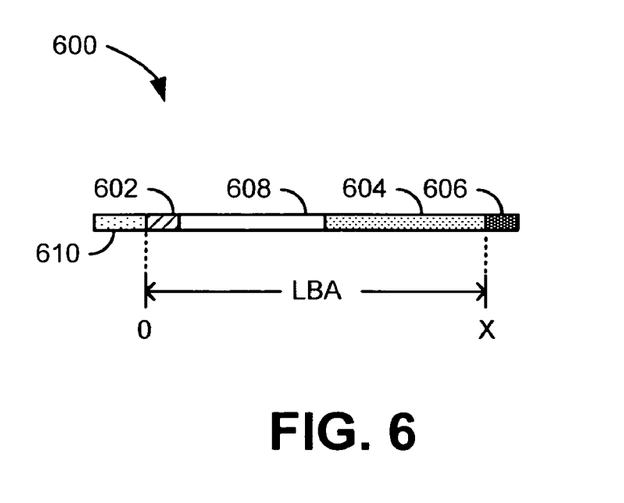
FIG. 6 is a cross-sectional view of the optical disc of FIG. 5 also illustrating a range of logical block addresses of an optical disc.

FIG. 6 depicts a cross-sectional view of the optical disc 500 of FIG. 5. Also depicted is a representation of the range of logical block addresses of the optical disc from 0 to X, where X can represent the highest address consistent with the capacity of the optical disc. The range of logical block addresses does not include the reserved space on the optical disc; therefore, the first LBA is located toward the outer region of the optical disc relative to the reserved space. The file system image 602 is located at the first available LBA and the data 604 is located at a space on the optical disc 600 terminating at the last available LBA. It should be noted that a reserved area 610, such as, for example, a lead-in area, can be located on an optical disc. This reserved area 610 cannot be used for the storage or addressing of data, despite its location on the optical disc; therefore, the first user addressable space or space on the disc that can be used for storage is located at LBA 0, which is adjacent to reserved area 610. Similarly, a reserved space 606, which can represent a lead-out track or lead-out area, is not a user addressable space on the optical disc 600. Because reserved spaces 606 and 610 are not included within the range of available LBA's on the optical disc 600, they are not considered when determining the location on the disc at which to store data in accordance with an embodiment of the disclosure. It would also be appreciated that the file system image 602 may not necessarily be written to the first available LBA, as the UDF specification, for example, provides that a file system image may be written at various other locations on an optical disc.

Figure 7:
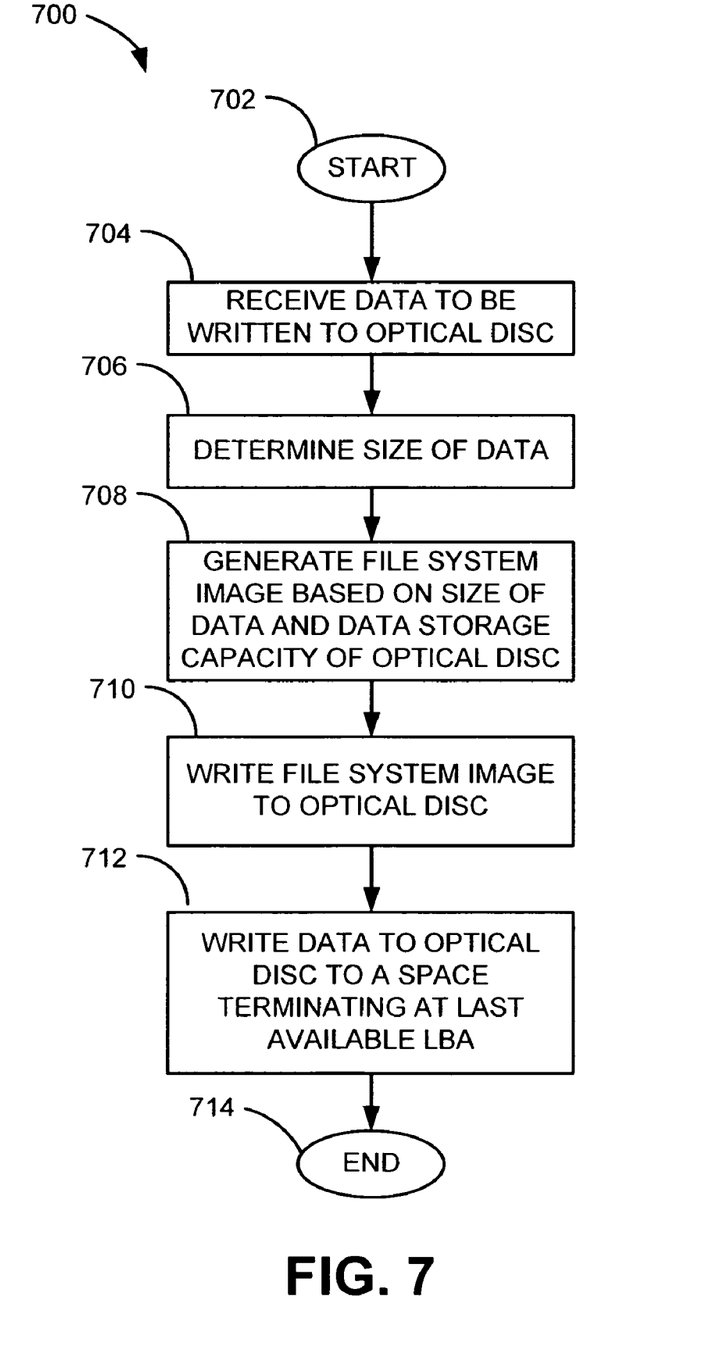
FIG. 7 is a flow-chart depicting a method in accordance with the disclosure.

FIG. 7 depicts an exemplary embodiment of a method according to the disclosure. It should be noted that the method depicted in FIG. 7 as well as other embodiments of the present disclosure could be implemented in hardware, software, firmware, or a combination thereof. In one embodiment(s), the method is implemented in software or firmware that is stored in a memory and that is executed by a suitable instruction execution system. If implemented in hardware, as in an alternative embodiment, the method can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

The flow chart of FIG. 7 shows the architecture, functionality, and operation of a possible implementation of the software programmed to write data to an optical disc as depicted in FIG. 3-6. In this regard, each block represents a module, segment, or portion of code, which comprises one or more executable instructions for implementing the specified logical function(s). It should also be noted that in some alternative implementations, the functions noted in the blocks may occur out of the order noted in FIG. 7. For example, two blocks shown in succession in FIG. 7 may in fact be executed substantially concurrently or the blocks may sometimes be executed in the reverse order, depending upon the functionality involved, as will be further clarified hereinbelow.

An optical disc of various types and standards may be used, including but not limited to: magneto-optical discs, Blue-ray Disc (BD), Blue-ray Disc Rewritable (BD-RE), Blue-ray Disc Write-once (BD-R), HD DVD, HD DVD-RW, HD DVD-RAM, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW. The data in the receiving step 704 can be supplied by a user of the method 700 or, alternatively, a software implementation of the method or software working in conjunction with the method. Also, a variety of file system specifications known in the art can be used when generating a file system image (708) and writing the data to the optical disc, including, but not limited to the Universal Disk Format (UDF), which is a standard used for data storage and retrieval with many modern optical disc standards. A file system image can be generated in accordance with the method based on the size of the received data, the data storage capacity of the optical disc, and a variety of factors known to a person of ordinary skill in the art. Further, while the method depicted in FIG. 7 depicts the use of logical block addresses (LBA) to determine the location on the optical disc where the file system image and data should be written (710 and 712), it would be appreciated by a person of ordinary skill in the art that an equivalent addressing scheme involving the use of physical addresses or other could be used in an embodiment according to the disclosure.

The depicted method can be encompassed in a software implementation, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of the present invention includes embodying the functionality of the preferred embodiments of the present invention in logic embodied in hardware or software-configured mediums.

Figure 8A:
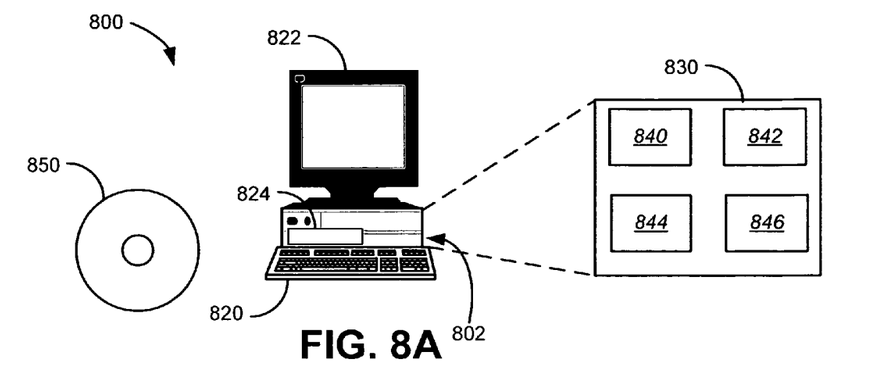
FIG. 8A depicts a system in accordance with the disclosure.

FIG. 8 depicts a non-limiting exemplary system 800 for embedding or executing a computer readable medium of a method in accordance with an embodiment of the disclosure. The system can include a computer system 802 having a display 822 and user input device 820, which may be a keyboard or a mouse, for example. The computer system 802 can also have an optical disc drive 824 capable of writing or storing data to an optical disc 850. Optical disc 850 can be an optical disc of various types and standards, including but not limited to: magneto-optical discs, Blue-ray Disc (BD), Blue-ray Disc Rewritable (BD-RE), Blue-ray Disc Write-once (BD-R), HD DVD, HD DVD-RW, HD DVD-RAM, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW.

Computer system 802 may have a mass storage device 812 which can be located internal to the computer system 802, that can store an operating system, application specific software and other data as well as software components of the computer system 802. Computer system 802 may also form a node on a network such as, but not limited to, a LAN or a WAN. In this configuration, data for storage on an optical disc 850 may be delivered over a network to computer system 802. The connection to a network may be any number of standard networking interfaces such as a CAT-5, or wireless connection. Computer system 802 may also include an additional optical disc drive (not shown) to receive and read an optical disc having data stored thereon.

Figure 8B:
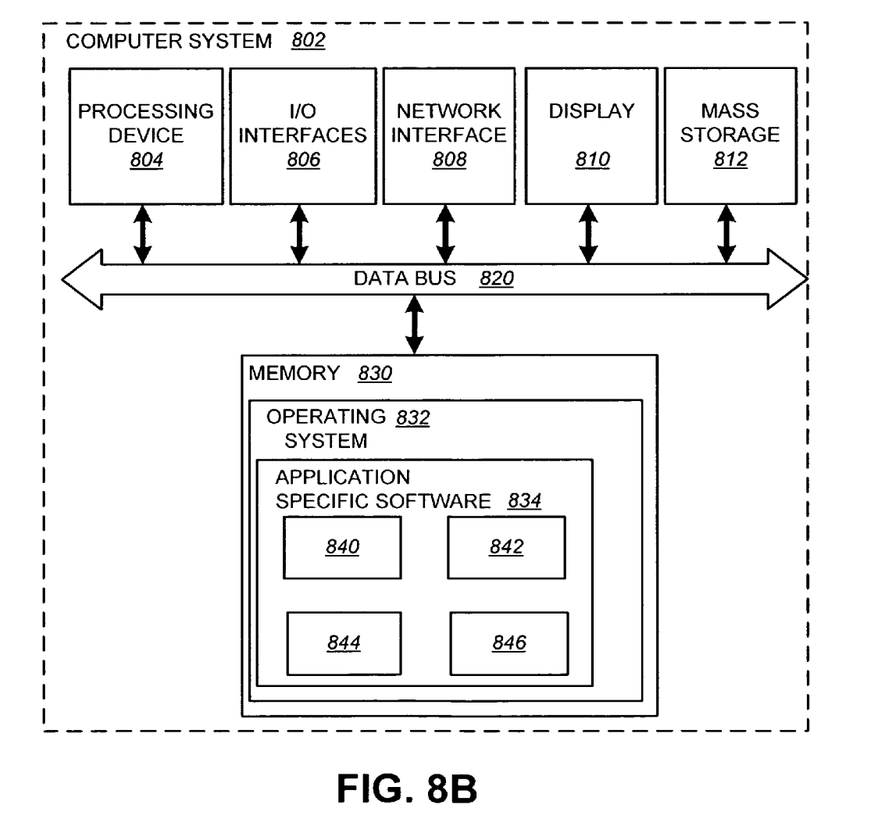
FIG. 8B depicts a functional block diagram of a system in accordance with the disclosure.

Computer system 802 includes a memory 830, which may be used to store a number of executable modules therein, including an operating system 832 and other application specific modules 834. In some embodiments these executable modules may be loaded from mass storage 812 into memory 830 for execution by computer system 802. In some embodiments of the system 800, any of a data receiving module 840, an optical disc analyzing module 842, a file system generating module 844, and an optical disc writing module 846 may be stored within and executed from memory 830. Memory 830 may include a number of other modules which, for example, could be sub-modules of the above modules. In general, data receiving module 840 functions to receive data selected by a user or other process or apparatus that is written or stored on an optical disc. Data receiving module 840 may function in a number of ways depending on the source of the data to be stored on an optical disc 850. Often, a user of computer system 802 will choose data that the user wishes to store on an optical disc and can communicate this choice via a software user interface. The chosen data can reside on a mass storage device 812, memory 830, retrieved from a network source, or derived in any number of ways known to a person of ordinary skill in the art.

In general, optical disc analyzing module 842 can function to determine the storage capacity of an optical disc 850 on which data is to be stored and whether there are locations on an optical disc 850 that are reserved, or, in other words, unavailable for the storage of data. Accordingly, file system generating module 844 functions to generate a file system image for an optical disc 850 based on information including, but not limited to, the storage capacity of an optical disc 850, the size of the data to be stored on the optical disc 850, and location(s) on the optical disc 850 at which data is to be stored. Finally, optical disc writing module 846 can function to direct an optical disc drive 824 capable of writing data to an optical disc 850 to write a generated file system image and received data to the optical disc 850.

In some embodiments, data receiving module 840, optical disc analyzing module 842, file system generating module 844 and optical disc writing module 846 may be combined into a single module that performs any combination of the tasks performed by each of the modules separately. Thus, any modules or submodules described herein are not limited to existing as separate modules. In reality all modules may operate apart from one another, or could easily be combined as one module. Additionally, it should be understood that each and every module is not essential to perform the systems and methods described herein.

As mentioned above, in some embodiments, a user may interact and control the operation of any of data receiving module 840, optical disc analyzing module 842, file system generating module 844 or optical disc writing module 846 through user input device 820 and a graphical user interface within display 822.

Figure 9:
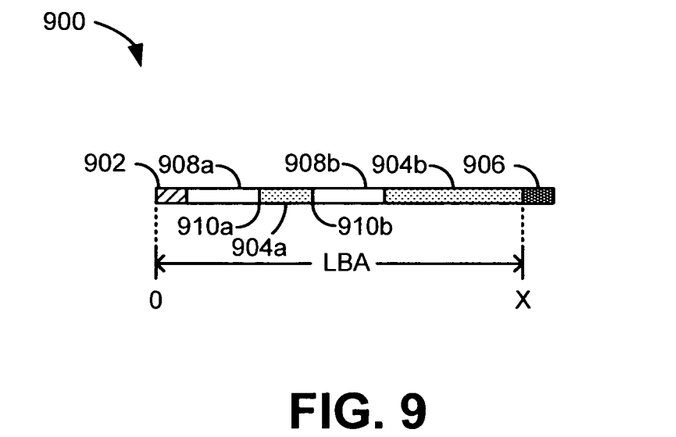
FIG. 9 is a cross sectional view of an optical disc showing an arrangement of data in accordance with an embodiment of the disclosure as written by an optical disc drive.

FIG. 9 represents a cross-sectional view of an optical disc 900 with data 904a, 904B stored thereon in accordance with an embodiment of the disclosure. As noted above, the depicted optical disc 900 used in accordance with an embodiment of the disclosure can conform to a variety of optical disc types and specifications known to a person of ordinary skill in the art, including but not limited to: magneto-optical discs, Blue-ray Disc (BD), Blue-ray Disc Rewritable (BD-RE), Blue-ray Disc Write-once (BD-R), HD DVD, HD DVD-RW, HD DVD-RAM, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW. In contrast to the above disclosed embodiments, data 904a, 904b can be arranged non-sequentially; however, reading and writing performance of the optical disc 900 can be improved by arranging the data 904a, 904b on the optical disc at physical locations other than sequentially beginning at the first available LBA.

As is depicted in FIG. 9, one portion of the data 904b is arranged on the optical disc 900 at the last available LBA of the disc and adjacent to empty space 908b. However, at least one portion of the data 904a can also be arranged at a different location on the optical disc 900. As can be seen in the drawing, data 904a has a first boundary 910a and a second boundary 910b, and neither boundary 910a, 910b is adjacent to the first available LBA or the last available LBA of the optical disc 900. Rather, in this particular depiction, data 904a has a first boundary 910a and a second boundary 910b that are adjacent to empty space 908a, 908b, respectively. It should be appreciated that this arrangement of data 904a, 904b on the optical disc 900 can still offer an improvement in reading or writing performance when the optical disc 900 is used with certain optical disc drives because at least a portion of the data 904a, 904b is not located sequentially beginning at a first available LBA or near the inner edge of the optical disc 900.

Figure 10:
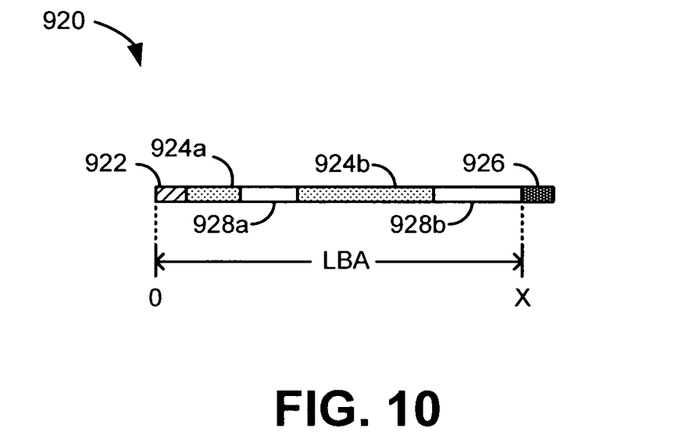
FIG. 10 is a cross sectional view of an optical disc showing an arrangement of data in accordance with an embodiment of the disclosure as written by an optical disc drive.

FIG. 10 depicts an alternative arrangement of data 924a, 924b on an optical disc 920. Data 924a is arranged sequentially beginning at a first available LBA of the optical disc 900. However, as can be seen in the drawing, data 924b also has a first and second boundary, and neither boundary is adjacent to the first available LBA or the last available LBA of the optical disc 920. Rather data 924b is adjacent to empty space 928a, 928b. As noted above, it should be appreciated that this arrangement of data 924a, 924b on the optical disc 900 can still offer an improvement in reading or writing performance when the optical disc 920 is used with certain optical disc drives because at least a portion of the data 924a, 924b is not located sequentially beginning at a first available LBA or adjacent to the inner ege of the optical disc 920.

Figure 11:
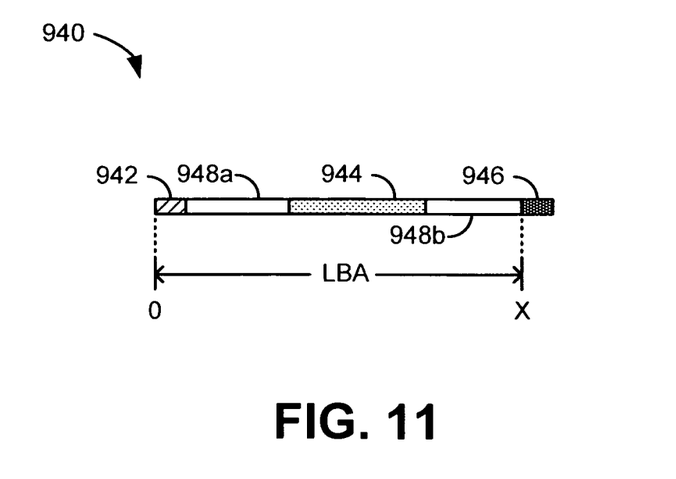
FIG. 11 is a cross sectional view of an optical disc showing an arrangement of data in accordance with an embodiment of the disclosure as written by an optical disc drive.

FIG. 11 depicts yet another alternative arrangement of data 944 on an optical disc 940. As in the previously disclosed depictions of an optical disc written in accordance with an embodiment of the disclosure, because the data 944 is not located at or adjacent to the inner edge or first available LBA of the optical disc 940, this arrangement of data 944 can offer an improvement in reading and writing performance when used in conjunction with certain optical disc drives.

Figure 12:
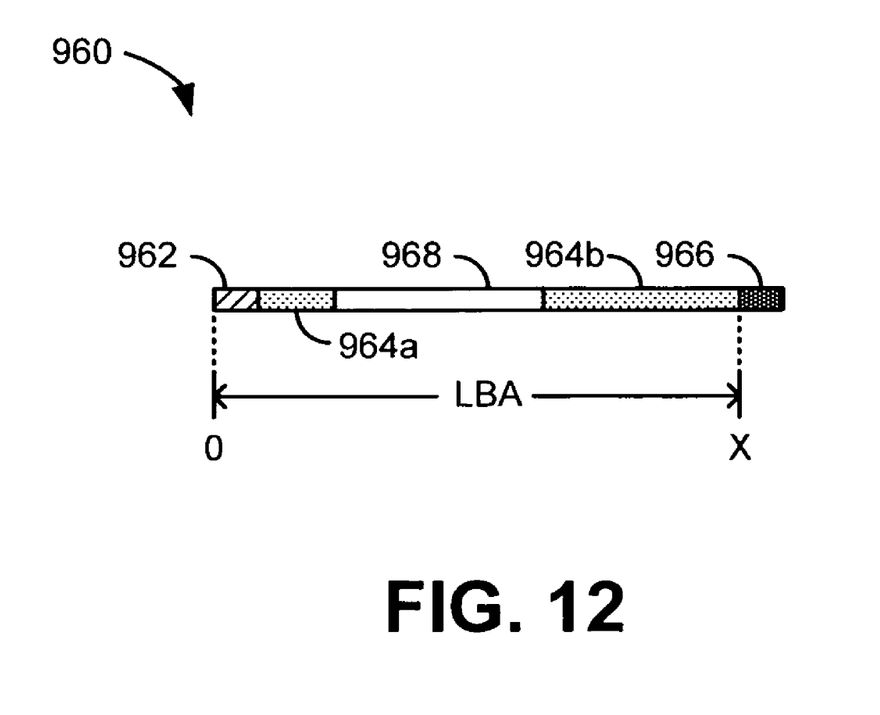
FIG. 12 is a cross sectional view of an optical disc showing an arrangement of data in accordance with an embodiment of the disclosure as written by an optical disc drive.
Figure 13:
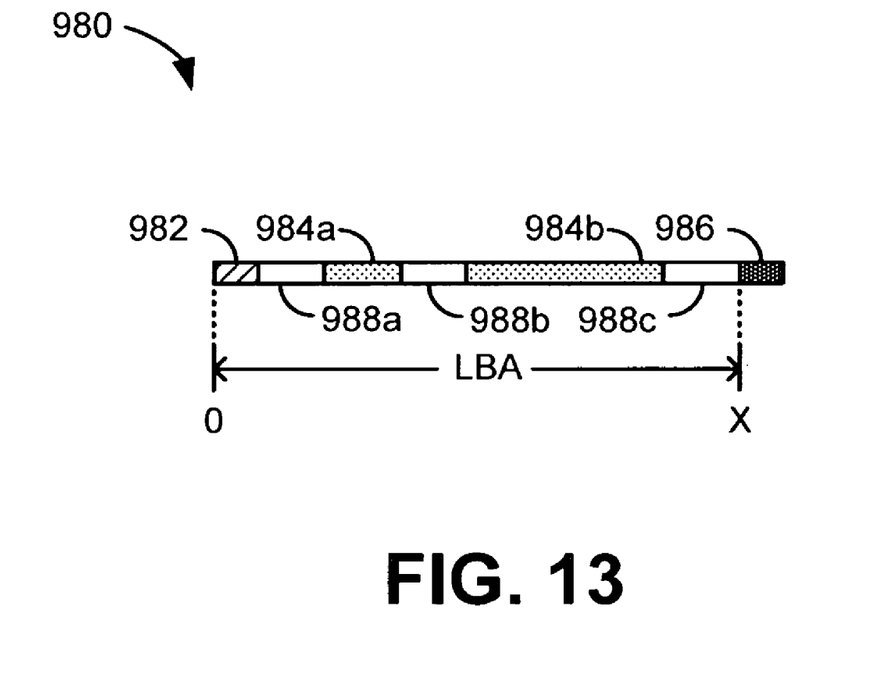
FIG. 13 is a cross sectional view of an optical disc showing an arrangement of data in accordance with an embodiment of the disclosure as written by an optical disc drive.

FIGS. 12 and 13 further depict optical discs 960, 980 written with alternative embodiments in accordance with the disclosure. It should again be appreciated that because data 964 and 984 of optical discs 960 and 980, respectively, are not written sequentially beginning at a first available LBA or sequentially substantially adjacent to the inner edge of optical discs 960, 980, reading and writing performance of optical discs 960, 980 can be improved when used with certain optical disc drives. The above FIGS. 9-13 depict various possible alternative results of an optical disc written by an embodiment of the disclosure, and is not intended to be an exhaustive list. It should now be appreciated that there could be alternative ways to write an arrange data on an optical disc in accordance with this disclosure, and it is intended that all such alternative embodiments be within the scope of this disclosure.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for writing data to an optical disc, comprising the steps of:
   receiving data to be written to an optical disc,
   determining the size of the data to be written to the optical disc,
   generating a file system image for the optical disc,
   writing the file system image to the optical disc, and
   writing at least a portion of the data to the optical disc to a space beginning at a LBA located at a distance equal to about the size of the data from the last available LBA and terminating at about the last available LBA of the optical disc, wherein writing at least the portion of the data to the optical disc to the space comprises identifying an empty space located entirely in a portion of the optical disc towards an outer edge of the disc and writing data to the empty space.

2. The method of claim 1, further comprising the step of: determining the data storage capacity of the optical disc.

3. The method of claim 1, wherein the optical disc comprises at least one selected from the following: magneto-optical discs, Blue-ray Disc (BD), Blue-ray Disc Rewritable (BD-RE), Blue-ray Disc Write-once (BD-R), HD DVD, HD DVD-RW, HD DVD-RAM, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW.

4. The method of claim 1, wherein the step of writing the file system image to the optical disc further comprises communicating with an optical disc drive in order to write the file system image to the optical disc, and wherein the step of writing the data to the optical disc further comprises communicating with an optical disc drive in order to write the data to the optical disc.

5. The method of claim 4, wherein the step of writing the file system image to the optical disc and wherein the step of writing the data to the optical disc include an optical disc drive comprising a non-constant linear velocity (non-CLV) optical disc drive.

6. The method of claim 4, wherein the step of writing the file system image to the optical disc and wherein the step of writing the data to the optical disc include an optical disc drive comprising a constant angular velocity (CAV) optical disc drive.

7. The method of claim 1, wherein the file system image contains information regarding the location and structure of the data, other file systems, or existing file systems on the optical disc.

8. A non-transitory computer readable medium with logic embedded therein for performing a method of writing data to an optical disc, comprising:
   logic for receiving data to be written to an optical disc,
   logic for determining the size of the data to be written to the optical disc,
   logic for generating a file system image for the optical disc, and
   logic for writing the file system image to the optical disc and writing at least a portion of the data to the optical disc at a space beginning at a LBA located at a distance equal to about the size of the data from the last available LBA and terminating at about the last available LBA of the optical disc, wherein writing at least the portion of the data to the optical disc at the space comprises identifying an empty space located entirely in a portion of the optical disc towards an outer edge of the disc and writing data to the empty space.

9. The non-transitory computer readable medium of claim 8, further comprising:
   logic for determining the data storage capacity of the optical disc.

10. The non-transitory computer readable medium of claim 8, wherein the optical disc comprises at least one selected from the following: magneto-optical discs, Blue-ray Disc (BD), Blue-ray Disc Rewritable (BD-RE), Blue-ray Disc Write-once (BD-R), HD DVD, HD DVD-RW, HD DVD-RAM, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW.

11. The non-transitory computer readable medium of claim 8, wherein the logic for writing the file system image to the optical disc further comprises communicating with an optical disc drive in order to write the file system image to the optical disc, and wherein the logic for writing the data to the optical disc further comprises communicating with an optical disc drive in order to write the data to the optical disc.

12. The non-transitory computer readable medium of claim 11, wherein the logic for writing the file system image to the optical disc and wherein the logic for writing the data to the optical disc include an optical disc drive comprising a non-constant linear velocity (non-CLV) optical disc drive.

13. The non-transitory computer readable medium of claim 11, wherein the logic for writing the file system image to the optical disc and wherein the logic for writing the data to the optical disc include an optical disc drive comprising a constant angular velocity (CAV) optical disc drive.

14. The non-transitory computer readable medium of claim 8, wherein the file system image can contain information regarding the location and structure of the data and other file systems on the optical disc.

15. A non-transitory computer readable medium with logic embedded therein for performing a method of writing data to an optical disc, comprising:
  logic for receiving data to be written to an optical disc and determining the size of the data,
  logic for generating a file system image, and
  logic for writing the file system image to the optical disc and writing at least a portion of the data at a space beginning at a distance from the outer region of the disc substantially equal to the size of the data and terminating at or about the outer region of the optical disc, wherein writing at least the portion of the data at the space comprises identifying an empty space located entirely in a portion of the optical disc towards an outer edge of the disc and writing data to the empty space.

16. The non-transitory computer readable medium of claim 15, further comprising:
  logic for determining the storage capacity of the optical disc.

17. The non-transitory computer readable medium of claim 15, wherein the optical disc comprises at least one selected from the following: magneto-optical discs, Blue-ray Disc (BD), Blue-ray Disc Rewritable (BD-RE), Blue-ray Disc Write-once (BD-R), HD DVD, HD DVD-RW, HD DVD-RAM, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW.

18. The non-transitory computer readable medium of claim 15, wherein the logic for writing the file system image to the optical disc further comprises communicating with an optical disc drive in order to write the file system image to the optical disc, and wherein the logic for writing the data to the optical disc further comprises communicating with an optical disc drive in order to write the data to the optical disc.

19. The non-transitory computer readable medium of claim 18, wherein the logic for writing the file system image to the optical disc and wherein the logic for writing the data to the optical disc include an optical disc drive comprising a non-constant linear velocity (non-CLV) optical disc drive.

20. The non-transitory computer readable medium of claim 18, wherein the logic for writing the file system image to the optical disc and wherein the logic for writing the data to the optical disc include an optical disc drive comprising a constant angular velocity (CAV) optical disc drive.

21. A method for writing data to an optical disc, comprising the steps of:
  receiving data to be written to an optical disc,
  determining the size of the data to be written to the optical disc,
  generating a file system image for the optical disc, and
  writing the file system image to the optical disc and writing at least a portion of the data at a space beginning at a distance from the outer region of the disc substantially equal to the size of the data and terminating at about the outer region of the optical disc, wherein writing at least the portion of the data at the space comprises identifying an empty space located entirely in a portion of the optical disc towards an outer edge of the disc and writing data to the empty space.

22. The method of claim 21, further comprising:
  determining the storage capacity of the optical disc.

23. The method of claim 21, wherein the optical disc comprises at least one selected from the following: magneto-optical discs, Blue-ray Disc (BD), Blue-ray Disc Rewritable (BD-RE), Blue-ray Disc Writeable (BD-R), HD DVD, HD DVD-RW, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW.

24. The method of claim 21, wherein the step of writing the file system image to the optical disc further comprises communicating with an optical disc drive in order to write the file system image to the optical disc, and wherein the step of writing the data to the optical disc further comprises communicating with an optical disc drive in order to write the data to the optical disc.

25. The method of claim 24, wherein the step of writing the file system image to the optical disc and wherein the step of writing the data to the optical disc include an optical disc drive comprising a non-constant linear velocity (non-CLV) optical disc drive.

26. The method of claim 21, wherein the step of writing the file system image to the optical disc and wherein the step of writing the data to the optical disc include an optical disc drive comprising a constant angular velocity (CAV) optical disc drive.

27. A method for writing data to an optical disc, comprising the steps of:
  receiving data to be written to an optical disc,
  determining the size of the data to be written to the optical disc,
  determining the data storage capacity of the optical disc by communicating with an optical disc drive,
  generating a file system image for the optical disc,
  writing the file system image to the optical disc by communicating with the optical disc drive, and
  writing at least a portion of the data to a space of the optical disc by communicating with the optical disc drive the space beginning at a LBA located at a distance equal to about the size of the data from the last available LBA and terminating at about the last available LBA of the optical disc, wherein writing at least the portion of the data to the optical disc to the space comprises identifying an empty space located entirely in a portion of the optical disc towards an outer edge of the disc and writing data to the empty space.

28. A non-transitory computer readable medium with logic embedded therein for performing a method of writing data to an optical disc, comprising:
  logic for receiving data to be written to an optical disc,
  logic for determining the size of the data to be written to the optical disc,
  logic for communicating with an optical disc drive to determine the storage capacity of the optical disc,
  logic for generating a file system image, and
  logic for communicating with an optical disc drive to write the file system image to the optical disc and writing at least a portion of the data to the optical disc at a space beginning at a LBA located at a distance equal to about the size of the data from the last available LBA and terminating at about the last available LBA of the optical disc, wherein writing at least the portion of the data to the optical disc at the space comprises identifying an empty space located entirely in a portion of the optical disc towards an outer edge of the disc and writing data to the empty space.

29. A method for writing data to an optical disc, comprising the steps of:
   receiving data to be written to an optical disc,
   determining the size of the data to be written to the optical disc,
   generating a file system image for the optical disc,
   writing the file system image to the optical disc, and
   writing at least one portion of the data to the optical disc, the at least one portion of the data having a first boundary and a second boundary, wherein the first boundary and the second boundary are not adjacent to the first available LBA of the optical disc and not adjacent to the last available LBA of the optical disc.

30. The method of claim 29, further comprising the step of:
   determining the data storage capacity of the optical disc.

31. The method of claim 29, wherein the optical disc comprises at least one selected from the following: magneto-optical discs, Blue-ray Disc (BD), Blue-ray Disc Rewritable (BD-RE), Blue-ray Disc Write-once (BD-R), HD DVD, HD DVD-RW, HD DVD-RAM, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW.

32. The method of claim 29, wherein the step of writing the file system image to the optical disc further comprises communicating with an optical disc drive in order to write the file system image to the optical disc, and wherein the step of writing the data to the optical disc further comprises communicating with an optical disc drive in order to write the data to the optical disc.

33. The method of claim 32, wherein the step of writing the file system image to the optical disc and wherein the step of writing the data to the optical disc include an optical disc drive comprising a non-constant linear velocity (non-CLV) optical disc drive.

34. The method of claim 32, wherein the step of writing the file system image to the optical disc and wherein the step of writing the data to the optical disc include an optical disc drive comprising a constant angular velocity (CAV) optical disc drive.

35. The method of claim 29, wherein the file system image contains information regarding the location and structure of the data, other file systems, or existing file systems on the optical disc.

36. A non-transitory computer readable medium with logic embedded therein for performing a method of writing data to an optical disc, comprising:
   logic for receiving data to be written to an optical disc,
   logic for determining the size of the data to be written to the optical disc,
   logic for generating a file system image for the optical disc, and
   logic for writing the file system image to the optical disc and writing at least one portion of the data to the optical disc, the at least one portion of the data having a first boundary and a second boundary, wherein the first boundary and the second boundary are not adjacent to the first available LBA of the optical disc and not adjacent to the last available LBA of the optical disc.

37. The non-transitory computer readable medium of claim 36, further comprising:
   logic for determining the data storage capacity of the optical disc.

38. The non-transitory computer readable medium of claim 36, wherein the optical disc comprises at least one selected from the following: magneto-optical discs, Blue-ray Disc (BD), Blue-ray Disc Rewritable (BD-RE), Blue-ray Disc Write-once (BD-R), HD DVD, HD DVD-RW, HD DVD-RAM, HD DVD-R, DVD, DVD-RW, DVD+RW, DVD-R, DVD+R, DVD-RAM, Holographic Versatile Disc, Universal Media Disc, Versatile Multi-layer Disc, Enhanced Versatile Disc (EVD), CD, CD-R, and CD-RW.

39. The non-transitory computer readable medium of claim 36, wherein the logic for writing the file system image to the optical disc further comprises communicating with an optical disc drive in order to write the file system image to the optical disc, and wherein the logic for writing the data to the optical disc further comprises communicating with an optical disc drive in order to write the data to the optical disc.

40. The non-transitory computer readable medium of claim 39, wherein the logic for writing the file system image to the optical disc and wherein the logic for writing the data to the optical disc include an optical disc drive comprising a non-constant linear velocity (non-CLV) optical disc drive.

41. The non-transitory computer readable medium of claim 39, wherein the logic for writing the file system image to the optical disc and wherein the logic for writing the data to the optical disc include an optical disc drive comprising a constant angular velocity (CAV) optical disc drive.

42. The non-transitory computer readable medium of claim 36, wherein the file system image can contain information regarding the location and structure of the data and other file systems on the optical disc.

* * * * *